United States Patent
Kim et al.

(10) Patent No.: US 12,415,420 B2
(45) Date of Patent: Sep. 16, 2025

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventors: Sungwang Kim, Seoul (KR); Jungdo Kim, Seoul (KR); Jaemin Moon, Yongin-si (KR); Minjae Park, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 203 days.

(21) Appl. No.: 18/493,078

(22) Filed: Oct. 24, 2023

(65) Prior Publication Data
US 2024/0262195 A1 Aug. 8, 2024

(30) Foreign Application Priority Data
Feb. 3, 2023 (KR) .................. 10-2023-0015058

(51) Int. Cl.
*B60K 35/00* (2024.01)
*B60W 50/14* (2020.01)
*B60K 35/81* (2024.01)

(52) U.S. Cl.
CPC ............. *B60K 35/00* (2013.01); *B60W 50/14* (2013.01); *B60K 35/81* (2024.01); *B60W 2050/146* (2013.01)

(58) Field of Classification Search
CPC ........ B60K 35/00; B60K 35/81; B60K 35/10; B60K 35/22; B60K 35/29; B60K 35/80; B60K 35/85; B60K 2360/566; B60K 35/20; B60K 35/28; B60W 50/14; B60W 2050/146; B60R 11/0241; B60Y 2400/92
See application file for complete search history.

(56) References Cited

U.S. PATENT DOCUMENTS

| | | | |
|---|---|---|---|
| 8,457,883 B2* | 6/2013 | Chen | G01C 21/362 701/423 |
| 9,098,180 B1* | 8/2015 | Craig | G06F 3/0488 |
| 9,997,063 B2* | 6/2018 | Kim | G08C 17/02 |
| 10,008,016 B2* | 6/2018 | Naveh | G06T 11/60 |
| 10,142,668 B1* | 11/2018 | Nijim | H04N 21/41407 |

(Continued)

FOREIGN PATENT DOCUMENTS

| | | |
|---|---|---|
| KR | 20180004030 A | 1/2018 |
| KR | 20180083073 A | 7/2018 |
| KR | 20200060086 A | 5/2020 |

*Primary Examiner* — Richard M Camby
(74) *Attorney, Agent, or Firm* — McDonnell Boehnen Hulbert & Berghoff LLP

(57) ABSTRACT

A vehicle includes at least one holder, a communication interface configured to communicate with a user terminal, a user interface device configured to visualize and output vehicle operating information, and a controller configured to, in response to the user terminal being mounted on the at least one holder, identify a position of the user terminal, determine auxiliary information to be displayed on the user terminal from the vehicle operating information based on the position of the user terminal, and control the communication interface to transmit the auxiliary information to the user terminal.

20 Claims, 13 Drawing Sheets

(56) References Cited

U.S. PATENT DOCUMENTS

| | | | |
|---|---|---|---|
| 11,400,997 B2 * | 8/2022 | Koosmann | G06F 3/0485 |
| 11,693,946 B2 * | 7/2023 | Bradley | H04W 4/00 |
| | | | 726/4 |
| 2014/0046590 A1 | 2/2014 | Needham et al. | |
| 2015/0127210 A1 | 5/2015 | Suzuki | |
| 2015/0373479 A1 | 12/2015 | Xia et al. | |
| 2019/0378475 A1 * | 12/2019 | Lim | B60K 35/81 |
| 2020/0164747 A1 * | 5/2020 | Oh | H04M 1/72406 |

* cited by examiner

VEHICLE AND METHOD OF CONTROLLING THE SAME

CROSS-REFERENCE TO RELATED APPLICATION(S)

This application claims the benefit of priority to Korean Patent Application No. 10-2023-0015058, filed on Feb. 3, 2023 in the Korean Intellectual Property Office, the disclosure of which is incorporated herein by reference.

TECHNICAL FIELD

The present disclosure relates to a vehicle configured for displaying information on vehicle operation in conjunction with a user terminal device and a method of controlling the same.

BACKGROUND

In addition to basic driving functions, vehicles also feature additional functions for user convenience, such as audio, video, navigation, air conditioning, broadcasting, seat heating, and communication with user terminals.

When performing a navigation function, a vehicle may display driving information on an In-Vehicle Infotainment (IVI) device, but the screen size of the IVI device is limited due to spatial constraints within the vehicle.

As a result, a technology that can communicate with a user device, such as a smartphone, to additionally display driving information on the smartphone has become desirable.

SUMMARY

Various aspects of the present disclosure provide a vehicle configured for determining auxiliary information to be displayed on a user terminal in response to the user terminal being mounted on a holder.

Furthermore, various aspects of the present disclosure provide a vehicle configured for determining a priority among vehicle operation-related information and to determining information having the highest priority as auxiliary information.

Additional aspects of the present disclosure will be set forth in part in the description which follows and, in part, will be obvious from the description, or may be learned by practice of the disclosure.

In accordance with an embodiment of the present disclosure, a vehicle includes at least one holder, a communication interface configured to communicate with a user terminal, a user interface device configured to visualize and output vehicle operating information, and a controller configured to, in response to the user terminal being mounted on the at least one holder, identify a position of the user terminal, determine auxiliary information to be displayed on the user terminal from the vehicle operating information based on the position of the user terminal, and control the communication interface to transmit the auxiliary information to the user terminal.

The vehicle operating information may include first information and second information, and the controller may determine priorities of the first information and the second information, and determine the first information or the second information as the auxiliary information based on the priorities.

The controller may determine information continuously displayed on the user interface device as a first priority between the first information and the second information.

The controller may determine information about driving guidance of the vehicle as a second priority between the first information and the second information.

The vehicle operating information may include first information and second information, and the controller may receive information about the user terminal through the communication interface, determine priorities of the first information and the second information based on a position of the user terminal and the information about the user terminal, and determine, based on the priorities, the first information or the second information as the auxiliary information.

The information about the user terminal may further include at least one of display size information, display resolution information, and tilt information of the user terminal.

The controller may determine the first information as the auxiliary information in response to the tilt information of the user terminal being identified as a first reference value, and determine the second information as the auxiliary information in response to the tilt information of the user terminal being identified as a second reference value.

The vehicle operating information may include first information and second information, and the controller may determine the first information as the auxiliary information in response to the position of the user terminal being identified as a first side of the user interface device, and determine the second information as the auxiliary information in response to the position of the user terminal being identified as a second side of the user interface device.

The controller may control the user interface device to visualize and output remaining information, excluding the auxiliary information from the vehicle operating information.

The controller may control the communication interface to identify the position of the user terminal based on an ultra-wideband (UWB) communication or a Bluetooth communication.

In accordance with another embodiment of the present disclosure, a method of controlling a vehicle including at least one holder, a communication interface communicating with a user terminal, a user interface device visualizing and outputting vehicle operating information is provided. The method includes identifying a position of the user terminal in response to the user terminal being mounted on the at least one holder, determining auxiliary information to be displayed on the user terminal from the vehicle operating information based on the position of the user terminal, and controlling the communication interface to transmit the auxiliary information to the user terminal.

The vehicle operating information may include first information and second information, and the determining of the auxiliary information may further include determining priorities of the first information and the second information, and determining the first information or the second information as the auxiliary information based on the priorities.

The determining of the priorities may further include determining information continuously displayed on the user interface device as a first priority between the first information and the second information.

The determining of the priorities may further include determining information about driving guidance of the vehicle as a second priority between the first information and the second information.

The vehicle operating information may include first information and second information, and the determining of the auxiliary information may further include receiving information about the user terminal through the communication interface, determining priorities of the first information and the second information based on a position of the user terminal and the information about the user terminal, and determining, based on the priorities, the first information or the second information as the auxiliary information.

The information about the user terminal may further include at least one of display size information, display resolution information, and tilt information of the user terminal.

The determining of the priorities may further include determining the first information as the auxiliary information in response to the tilt information of the user terminal being identified as a first reference value, and determining the second information as the auxiliary information in response to the tilt information of the user terminal being identified as a second reference value.

The vehicle operating information may include first information and second information, and the determining of the priorities may further include determining the first information as the auxiliary information in response to the position of the user terminal being identified as a first side of the user interface device, and determining the second information as the auxiliary information in response to the position of the user terminal being identified as a second side of the user interface device.

The method may further include controlling the user interface device to visualize and output remaining information, excluding the auxiliary information from the vehicle operating information.

The identifying of the position of the user terminal may further include controlling the communication interface to identify the position of the user terminal based on an UWB communication or a Bluetooth communication.

BRIEF DESCRIPTION OF THE DRAWINGS

These and/or other aspects of embodiments of the disclosure will become apparent and more readily appreciated from the following description of the embodiments, taken in conjunction with the accompanying drawings, in which.

DETAILED DESCRIPTION

Figure 1:
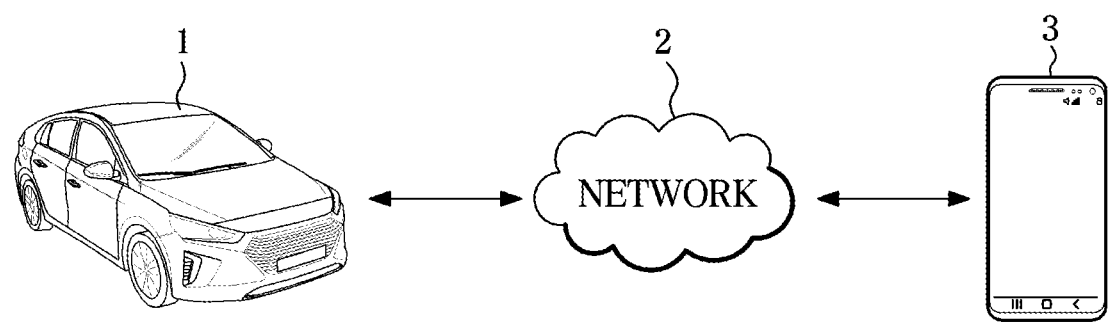
FIG. 1 is a view illustrating communication of a vehicle according to an exemplary embodiment of the present disclosure.

Reference will now be made in detail to the embodiments of the disclosure, examples of which are illustrated in the accompanying drawings, wherein like reference numerals refer to like elements throughout. This specification does not describe all elements of the disclosed embodiments and detailed descriptions of what is well known in the art or redundant descriptions on substantially the same configurations have been omitted. The terms 'part', 'module', 'member', 'block' and the like as used in the specification may be implemented in software or hardware. Further, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the disclosure will be described in detail with reference to the accompanying drawings.

FIG. 1 is a view illustrating communication of a vehicle according to an embodiment of the disclosure.

Referring to FIG. 1, a vehicle 1 according to an embodiment of the disclosure may communicate with a user terminal 3 via a network 2, which provides communication between the user terminal 3 and the vehicle 1.

The user terminal 3 communicating with the vehicle 1 according to an embodiment of the disclosure may display auxiliary information, which is visually recognizable by a user, among driving information of the vehicle on a display.

The user terminal 3 may include at least one of a smartphone, a tablet personal computer (PC), a mobile phone, a video phone, an e-book reader, a desktop PC, a laptop PC, a netbook computer, a personal digital assistant (PDA), a portable multimedia player (PMP), a MP3 player, a camera, a wearable device (e.g., head-mounted-device (HMD) such as electronic grasses), an electronic clothing, an electronic bracelet, an electronic necklace, an electronic appcessory, a smart watch, or the like.

Furthermore, the user terminal 3 according to various embodiments of the present disclosure may be a flexible device. In addition, it is obvious to those skilled in the art that the user terminal 3 according to various embodiments of the present disclosure is not limited to the aforementioned devices.

A network according to one embodiment may support communication between the vehicle 1 and the user terminal 3, and may include at least one of a telecommunication network, for example, a computer network (e.g., local area network (LAN) or wide area network (WAN)), an Internet, or a telephone network. However, the type of network is not limited to the above examples, and any network for supporting communication may be included without limitation.

As described above, the vehicle 1 and the user terminal 3 may communicate via a network, or may communicate directly via Bluetooth or Ultra-wideband (UWB). Accordingly, the vehicle 1 according to one embodiment may transmit auxiliary information to be displayed on the user terminal 3 among vehicle driving information to the user terminal 3.

Hereinafter, an internal configuration of the vehicle 1 provided with a user interface device 100 will be described, wherein the user interface device 100 includes a holder for device (e.g., a user terminal).

Figure 2:
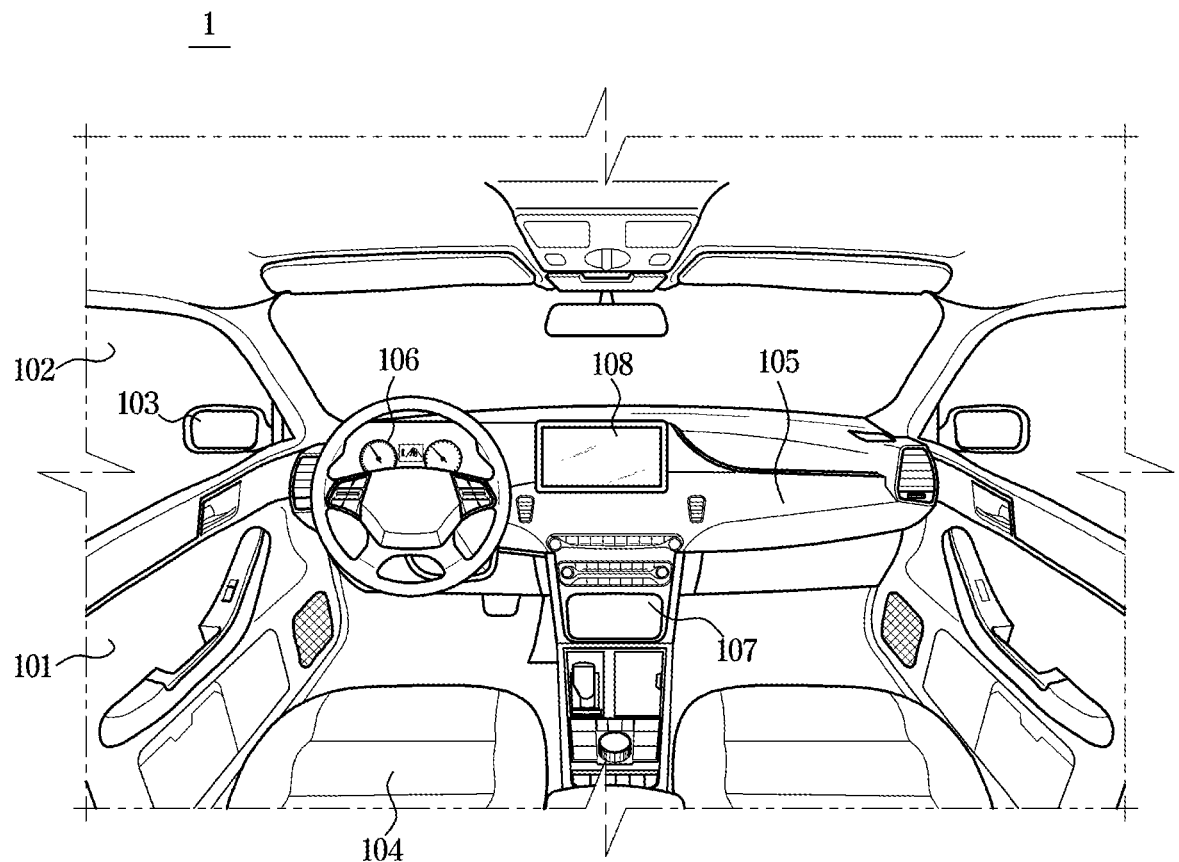
FIG. 2 is a view illustrating an interior of a vehicle according to an exemplary embodiment of the present disclosure.

FIG. 2 is a view illustrating the interior of a vehicle according to an embodiment of the present disclosure.

As shown in FIG. 2, the vehicle 1 may include front and rear doors 101, window glasses 102 (also referred to as windows) installed on the front and rear doors 101, respectively, and a side mirror which provides a rearward field of view of the vehicle 1 to a driver.

The interior of the vehicle body may include a seat 104 on which an occupant sits, a dashboard 105, an instrument cluster (i.e. a cluster 106) disposed on the dashboard and including a tachometer, a speedometer, a coolant temperature gauge, a fuel gauge, a turn signal indicator, a high beam indicator, a warning lamp, a seat belt warning lamp, an odometer, a trip computer, an automatic shift selector indicator, a door open warning lamp, an engine oil warning lamp, and a low fuel warning lamp, and a center fascia 107 with audio and a control panel for a heater and an air conditioner.

The center fascia 107 may include the user interface device 100 including an air vent, a cigarette jack, and an audio/video/navigation (AVN) device. Herein, the user interface device 100 may be referred to as an In-Vehicle Infotainment (IVI) device.

The user interface device 100 may include at least one holder (also referred to as a holder) thereon, and the user terminal 3 may be mounted on the holder. The user interface device 100 may be integrally provided with the cluster 106, and if integrally provided, the holder may be arranged above, to the right of or below the user interface device 100.

Next, a configuration for controlling the vehicle 1 according to an exemplary embodiment of the present disclosure will be described with reference to FIG. 3.

Figure 3:
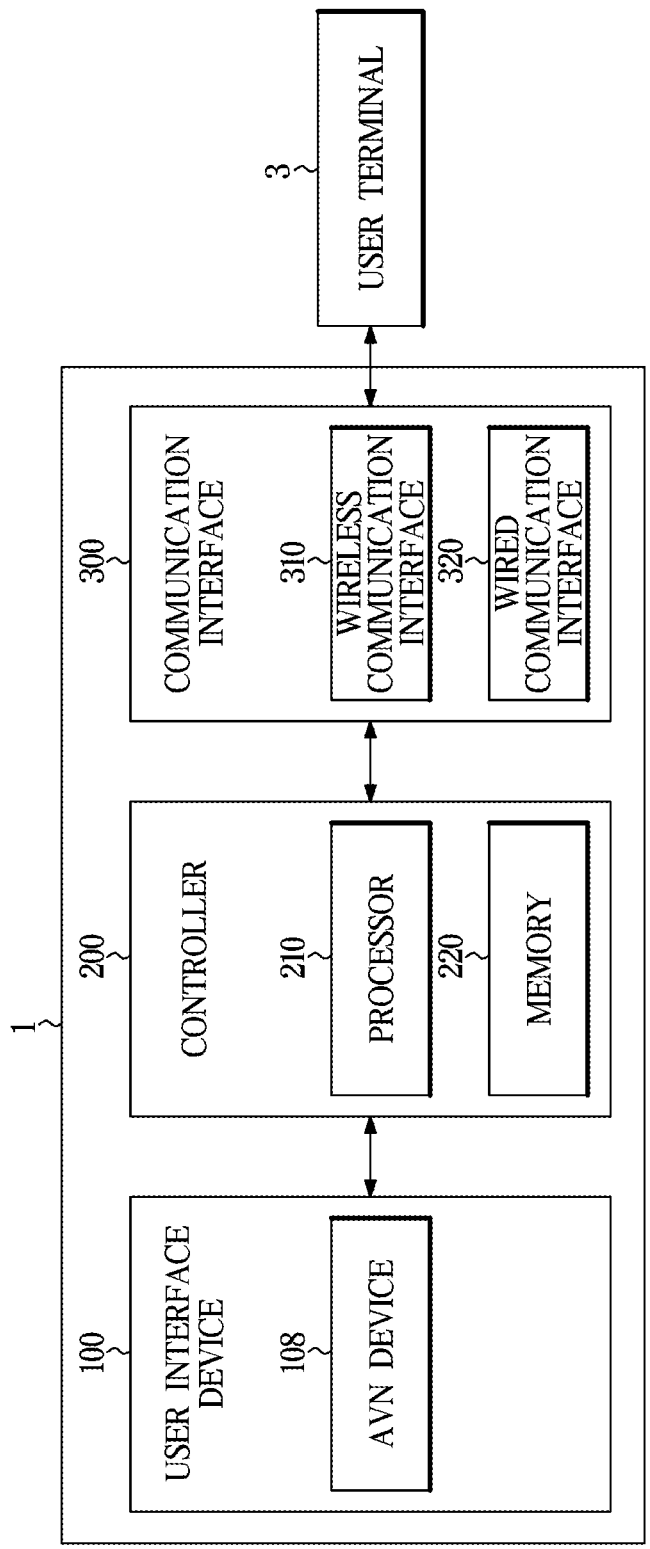
FIG. 3 is a control block diagram illustrating a vehicle according to an exemplary embodiment of the present disclosure.

FIG. 3 is a control block diagram illustrating a vehicle according to an exemplary embodiment of the present disclosure.

Referring to FIG. 3, the vehicle 1 may include the user interface device 100 including an AVN device 108, a communication interface 300 performing wired/wireless communication with the user terminal 3, and a controller 200 controlling the aforementioned components.

The AVN device 108, included in the user interface device 100, may include an input part and an output part. The input part may receive an input 1 from a driver necessary for controlling the vehicle to transmit to the controller 200, and the output part may include a display and visualize information related to an operation of the vehicle (hereinafter also referred to as vehicle operating information).

As described above, the user interface includes the AVN device 108, but in one embodiment, the user interface displaying vehicle operating information is not limited to the display of the AVN device 108.

The controller 200 of the vehicle 1 according to an exemplary embodiment of the present disclosure may communicate wired or wirelessly with the user terminal 3 by controlling the communication interface 300, and transmit auxiliary information corresponding to some of the vehicle operating information to the user terminal 3.

The communication interface 300 may communicate with the user terminal 3 through direct communication or a wireless communication base station.

For example, communication methods may employ second-generation (2G) communication methods, such as time division multiple access (TDMA) and code division multiple access (CDMA), third-generation (3G) communication methods, such as wideband code division multiple access (WCDMA), code division multiple access (CDMA2000), wireless broadband (Wibro), and world interoperability for microwave access (WiMAX), and fourth-generation (4G) communication methods, such as long term evolution (LTE) and wireless broadband evolution. The communication interface 300 may also employ fifth-generation (5G) communication methods.

The communication interface 300 may include one or more components enabling communication with the user terminal 3, and may include, for example, at least one of a wired communication interface 320 and a wireless communication interface 310.

The wireless communication interface 310 may include a short-range communication module. The short-distance communication module may include various short-distance communication modules for transmitting and receiving signals using a wireless communication network in a short distance, such as a Bluetooth module, an infrared communication module, a radio frequency identification (RFID) communication module, a wireless local access network (WLAN) communication module, a near field communication (NFC) module, and a Zigbee communication module, or the like.

The wireless communication interface 310 may include a wireless communication module supporting various wireless communication methods, such as radio data system-traffic message channel (RDS-TMC), digital multimedia broadcasting (DMB), a WiFi module, and a wireless broadband (WiBro) module, a global system for mobile communication (GSM) module, code division multiple access (CDMA), wideband code division multiple access (WCDMA), universal mobile telecommunications system (UMTS), time division multiple access (TDMA), LTE, or the like.

The wireless communication interface 310 may include a wireless communication interface including an antenna and a receiver for receiving auxiliary information from the user terminal 3. In addition, the wireless communication interface 310 may further include a signal conversion module for demodulating an analog type of wireless signal received through a wireless communication interface into a digital control signal.

The wired communication interface 320 may include a variety of wired communication modules, such as a controller area network (CAN) communication module, a local area network (LAN) module, a wide area network (WAN) module, a value added network (VAN) module, or the like, and various cable communications, such as universal serial bus (USB), high definition multimedia interface (HDMI), digital visual interface (DVI), recommended standard 232 (RS-232), power line communication, plain old telephone service (POTS), or the like.

The controller 200 may include a memory 220 for storing/temporarily storing programs and/or data, and a processor 210 for processing user input and/or metal guide detection data and/or communication data according to the programs and/or data stored in the memory 220.

The controller 200 may further include software such as programs and/or data stored in the memory 220 and processed by the processor 210, as well as hardware such as the memory 220 and the processor 210.

The memory 220 may store/temporarily store programs and/or data. A program includes a plurality of instructions combined to perform a specific function, and data may be processed and/or manipulated by the plurality of instructions included in the program. In addition, the program and/or data may include system programs and/or system data directly related to the control of the vehicle 1 and application programs and/or application data providing convenience and entertainment to the user.

The memory 220 may include a non-volatile memory 220 for storing programs and/or data for controlling components included in the vehicle 1 and a volatile memory 220 for storing temporary data generated while controlling components included in the vehicle 1.

The non-volatile memory 220 may, for example, store programs and/or data electrically, magnetically, or optically. The non-volatile memory 220 may include, for example, read only memory (ROM) and flash memory 220 for long-term storage of data. In addition, the non-volatile memory 220 may include solid state driver (SSD), hard disk drive (HDD), or optical disk drive (ODD).

The volatile memory 220 may, for example, load programs and/or data from the non-volatile memory 220 and electrically store the programs and/or data. The volatile memory 220 may include, for example, static random access memory (S-RAM) or dynamic random access memory (D-RAM) for temporarily storing data.

The memory 220 may store/temporarily store programs and data, such as operating system (OS), middleware, and applications, and provide programs and data to the processor 210 in response to a request of the processor 210.

The processor 210 may determine whether the user terminal 3 is mounted and/or determine the position of the user terminal 3 and/or process communication data of the communication interface 300 according to the programs and/or data stored/temporarily stored in the memory 220. In addition, the processor 210 may generate a control signal for controlling an operation of the vehicle 1 based on data processing.

The controller 200, including the processor 210 and the memory 220 described above, may identify the position of the user terminal 3 in response to the user terminal 3 being mounted on the holder, determine auxiliary information to be displayed on the user terminal 3 from the vehicle operating information based on the position of the user terminal 3, and control the communication interface 300 to transmit the determined auxiliary information to the user terminal 3.

The controller 200 may determine a priority of a first information and a second information included in the vehicle operating information, and determine the first information or the second information as auxiliary information based on the priority.

The controller 200 may determine information continuously displayed on the user interface device 100 as a first priority of the first information and the second information.

The controller 200 may determine information about driving guidance of the vehicle 1 as a second priority of the first information and the second information.

The controller 200 may receive the information on the user terminal 3 through the communication interface 300, prioritize the first information and the second information based on the position of the user terminal 3 and the information on the user terminal 3, and determine the first information or the second information as auxiliary information based on the priorities.

The controller 200 may determine the first information as auxiliary information in response to tilt information of the user terminal 3 being identified as a first reference value, and determine the second information as auxiliary information in response to the tilt information of the user terminal 3 being identified as a second reference value.

The controller 200 may determine the first information as auxiliary information in response to the position of the user terminal 3 being identified as a first side of the user interface device 100, and determine the second information as auxiliary information in response to the position of the user terminal 3 being identified as a second side of the user interface device 100.

The controller 200 may control the user interface device 100 to visualize and output information except for the auxiliary information from the driving information of the vehicle 1.

The controller 200 may control the communication interface 300 so as to identify the position of the user terminal 3 based on UWB or Bluetooth communication.

A specific control method of the controller 200 will be described in detail later, accompanied by drawings corresponding to embodiments.

Figure 4:
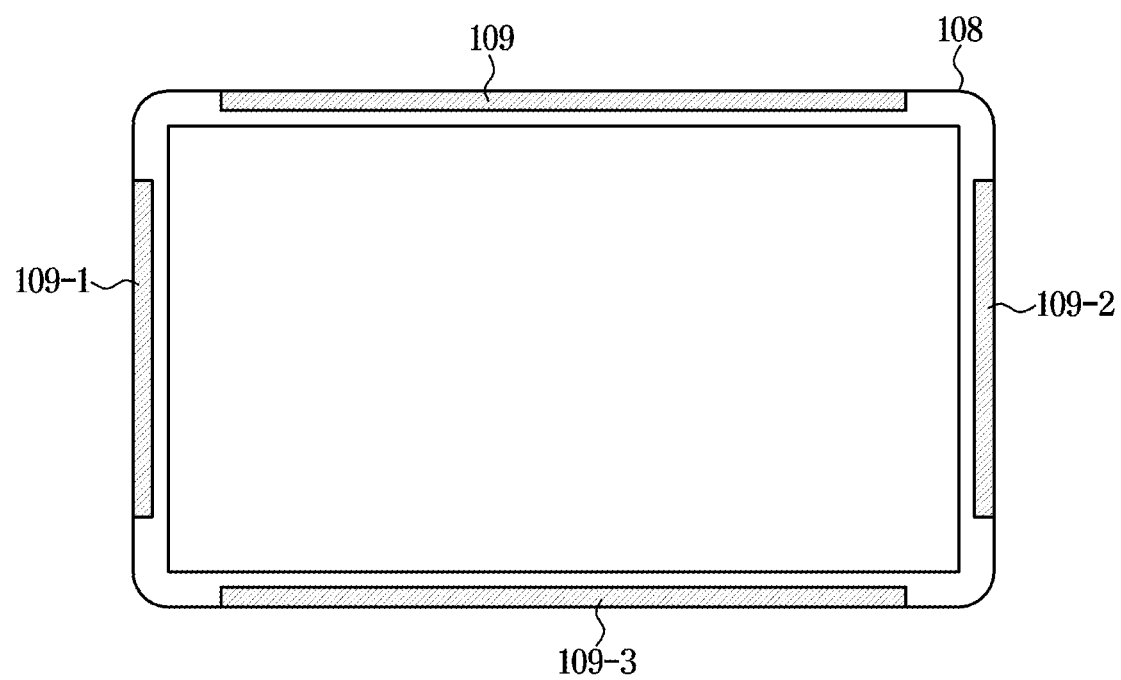
FIG. 4 is a view illustrating a user interface device and a holder of a vehicle according to an exemplary embodiment of the present disclosure.
Figure 5:
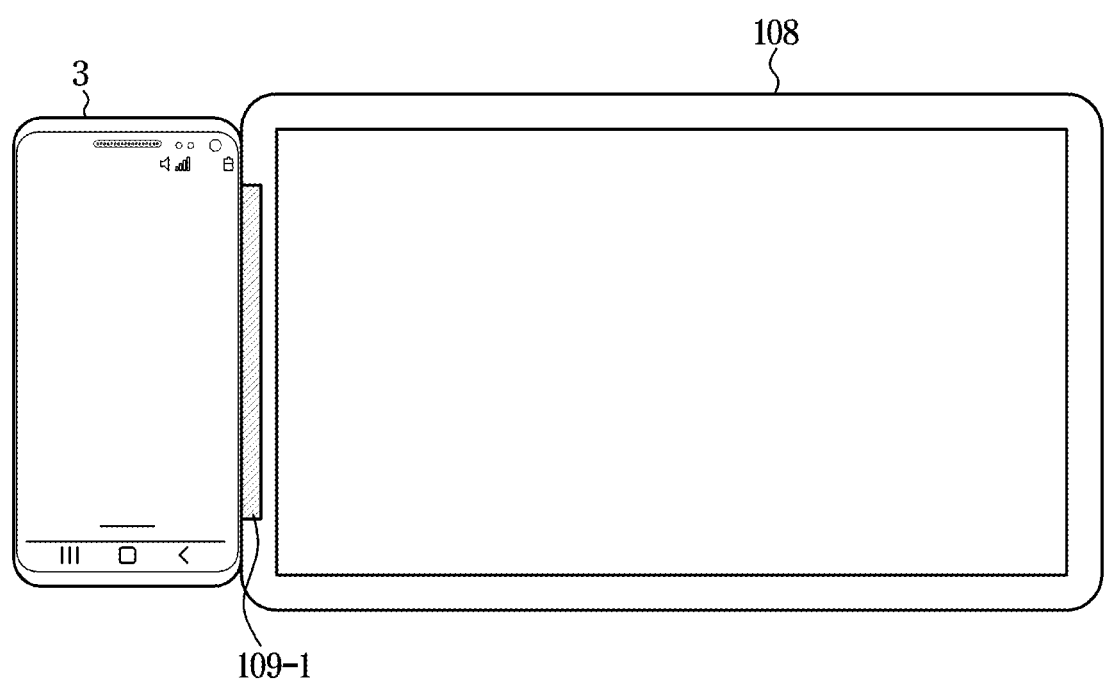
FIG. 5 is a view illustrating that a user terminal is mounted on a holder of a vehicle according to an exemplary embodiment of the present disclosure.

FIG. 4 is a view illustrating a user interface device and a holder of a vehicle according to an exemplary embodiment of the present disclosure, and FIG. 5 is a view illustrating a user terminal mounted on a holder of a vehicle according to an exemplary embodiment of the present disclosure.

Referring to FIG. 4, the user interface device 100 may include holders 109, 109-1, 109-2, and 109-3 at the top, bottom, left side, and right side of the circumference thereof. The holders 109, 109-1, 109-2, and 109-3 may be made of a magnetic material so that the user terminal 3 having magnetism may be mounted thereon.

The user terminal 3 may be mounted by being coupled with a magnetic force to any one of the top, bottom, left, or right sides of the holders 109, 109-1, 109-2, and 109-3 according to the user selection. Accordingly, the user terminal 3 made of a magnetic material or a case of the user terminal 3 made of a magnetic material may be mounted on the holder of the user interface device 100.

Referring to FIG. 5, the user terminal 3 may be mounted on the left side holder of the user interface device 100. As shown in FIG. 5, when the user terminal 3 is mounted on the holder of the user interface device 100, the information about the driving of the vehicle 1 is also displayed on the user terminal 3, thereby affecting the enlargement of the display size of the user interface device 100.

To this end, the controller 200 may determine whether the user terminal 3 is mounted on the user interface device 100 in a magnetic manner. In particular, the controller 200 may determine whether the user terminal 3 is mounted based on a change in magnetic force or a change in permittivity according to a capacitance value.

Furthermore, the controller 200 may determine the position of the user terminal 3 based on wireless communication, such as Bluetooth or UWB communication, and accordingly, may determine that the user terminal 3 is mounted at a certain position of the user interface device 100 when the user terminal 3 is located within a predetermined distance from the user interface device 100.

Although the user terminal 3 is mounted long in the vertical direction shown in FIG. 5, the user terminal 3 may be mounted long in the left and right directions. Accordingly, the controller 200 may determine appropriate auxiliary information to be displayed on the user terminal 3 based on a mounting position and direction of the user terminal 3. At this time, determination on the mounting direction of the user terminal 3 by the controller 200 may be determined, for example, based on an output value of a tilt sensor of the user terminal 3, and the tilt sensor may include a gyro sensor.

Furthermore, although the user interface device 100 is described in FIG. 5 as being made of a magnetic material, the user interface device 100 may be mounted in a structure that may be physically mounted by a separate mounting groove. In this case, the determination of mounting by the controller 200 may be made based on wireless communication, such as Bluetooth or UWB communication.

Figure 6:
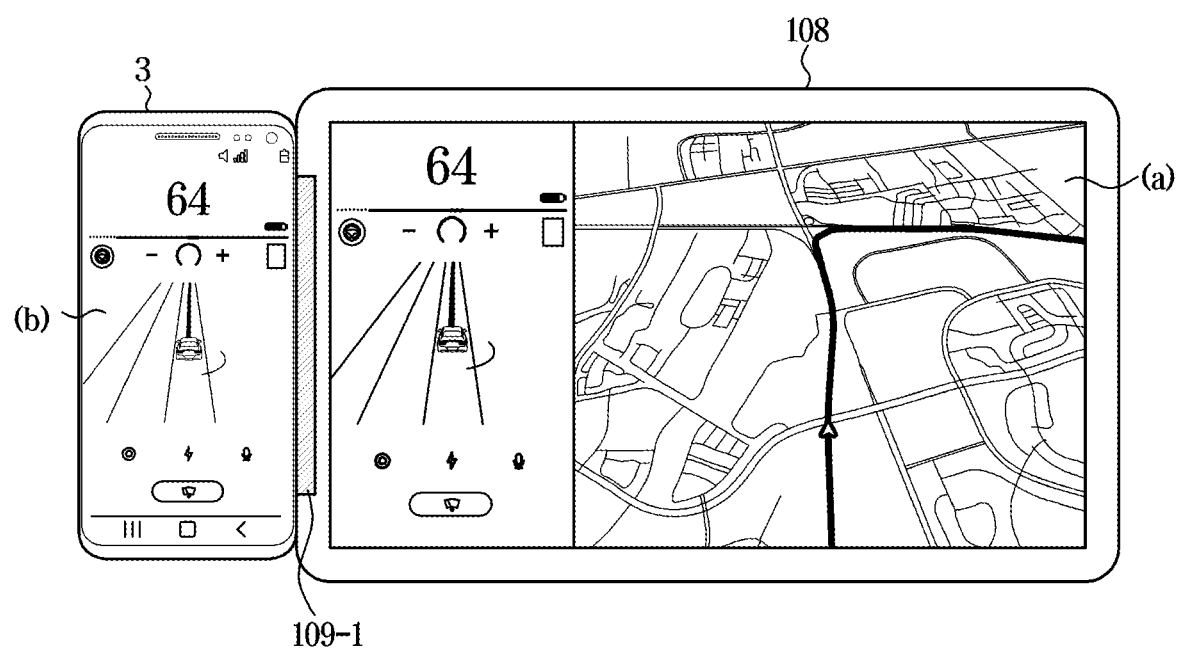
FIG. 6 is a view illustrating that a user terminal is mounted on a left side holder according to an exemplary embodiment of the present disclosure.

FIG. 6 is a view illustrating that a user terminal is mounted on a left side holder according to an exemplary embodiment of the present disclosure.

Referring to FIG. 6, a user of the vehicle 1 according to an exemplary embodiment of the present disclosure may mount the user terminal 3 on the left side holder 109-1 of the user interface device 100.

As described above, the controller 200 may determine whether the user terminal 3 is mounted on the holder 109-1 of the user interface device 100, and determine the position of the user terminal 3 based on the user terminal 3 being mounted. After the position of the user terminal 3 is determined, the controller 200 may determine auxiliary information (b) to be displayed on the user terminal 3 mounted at the determined position among the vehicle operating information displayed on the user interface device 100.

At this time, the determination of the auxiliary information (b) by the controller 200, includes determining priorities among the vehicle operating information and determining the information having a higher priority as the auxiliary information (b). In other words, the controller 200 may determine a priority of information that is continuously displayed on the user interface device 100, such as cluster information, or information that is continuously displayed on the user interface device 100, such as a taxi fare meter, as the first priority.

Furthermore, the controller 200 may determine the priority of information about the driving guidance of the vehicle 1, such as route information of the vehicle 1, among the vehicle operating information displayed on the user interface device 100 as the second priority.

In addition, the controller 200 may receive information about the user terminal 3 from the user terminal 3, and the information about the user terminal 3 may include display size information, resolution information, and tilt information of the user terminal 3. If the priorities determined above based on the received information about the user terminal 3 are the same, the controller 200 may set a higher priority.

For example, as shown in FIG. 6, the controller 200 may control the user interface device 100 to display route information (a) of the vehicle operating information on the user interface device 100. At this time, upon determining that the user terminal 3 is mounted on the left side holder 109-1, the controller 200 may determine the auxiliary information (b) to be displayed on the user terminal 3 mounted on the left side holder 109-1 from among the route information (a) displayed on the user interface device 100.

Based on such a priority determination method, the controller 200 may determine the priority of the information continuously displayed on the user interface device 100 as the first priority, among the information displayed on the user interface device 100. The information continuously displayed in FIG. 6 may include driving-related information including a speed of the vehicle 1 and a current location of the vehicle 1 on a map in which the current location of the vehicle 1 is indicated by a triangle.

The controller 200 may obtain a matching relationship from a storage in which the position of the user terminal 3 and the vehicle operating information are matched and stored, and based on the matching relationship, obtain the auxiliary information (b). In particular, the controller 200 may determine the route information displayed in the vertical direction on the left as the auxiliary information (b) based on the relationship that the user terminal 3 is mounted on the left side and vertically.

Consequently, the controller 200 may determine the route information continuously displayed on the user interface device 100 as the auxiliary information (b) and transmit the determination to the user terminal 3.

Figure 7:
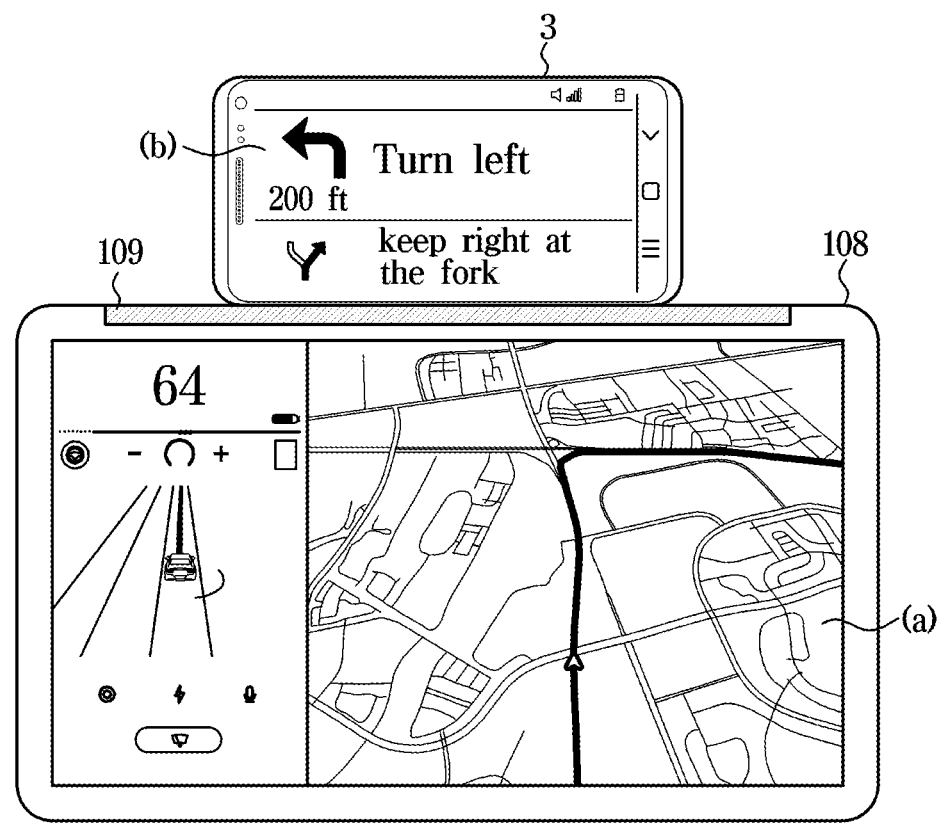
FIG. 7 is a view illustrating a user terminal mounted on an upper side holder according to an exemplary embodiment of the present disclosure.

FIG. 7 is a view illustrating a user terminal mounted on a top holder according to an exemplary embodiment of the present disclosure.

As shown in FIG. 7, the controller 200 may control the user interface device 100 to display the route information (a) of the vehicle operating information on the user interface device 100. At this time, upon determining that the user terminal 3 is mounted on the top holder 109, the controller 200 may determine the auxiliary information (b) to be displayed on the user terminal 3 mounted on the top holder 109 from among the information displayed on the user interface device 100.

Based on such a priority determination method, the controller 200 may determine the priority of the information continuously displayed on the user interface device 100 as the first priority among the information displayed on the user interface device 100. The information continuously displayed in FIG. 7 may include the driving-related information including the speed of the vehicle 1 and the current location of the vehicle 1 on a map in which the current location of the vehicle 1 is indicated by a triangle.

The controller 200 may obtain the matching relationship from a storage in which the position of the user terminal 3 and the vehicle operating information are matched and stored, and based on the matching relationship, obtain the auxiliary information (b). In particular, the controller 200 may determine information on a direction of the vehicle 1 closest to the user terminal 3, which is displayed in the horizontal direction, as the auxiliary information (b) based on the relationship that the user terminal 3 is mounted on the top and horizontally.

Although the information on the direction of the vehicle 1 has the second priority, the controller 200 may determine the information on the direction of the vehicle 1 as the auxiliary information (b) by increasing its priority based on the position and direction of the user terminal 3.

Consequently, the controller 200 may determine the information on the direction as the auxiliary information (b) and transmit the determination to the user terminal 3.

Figure 8:
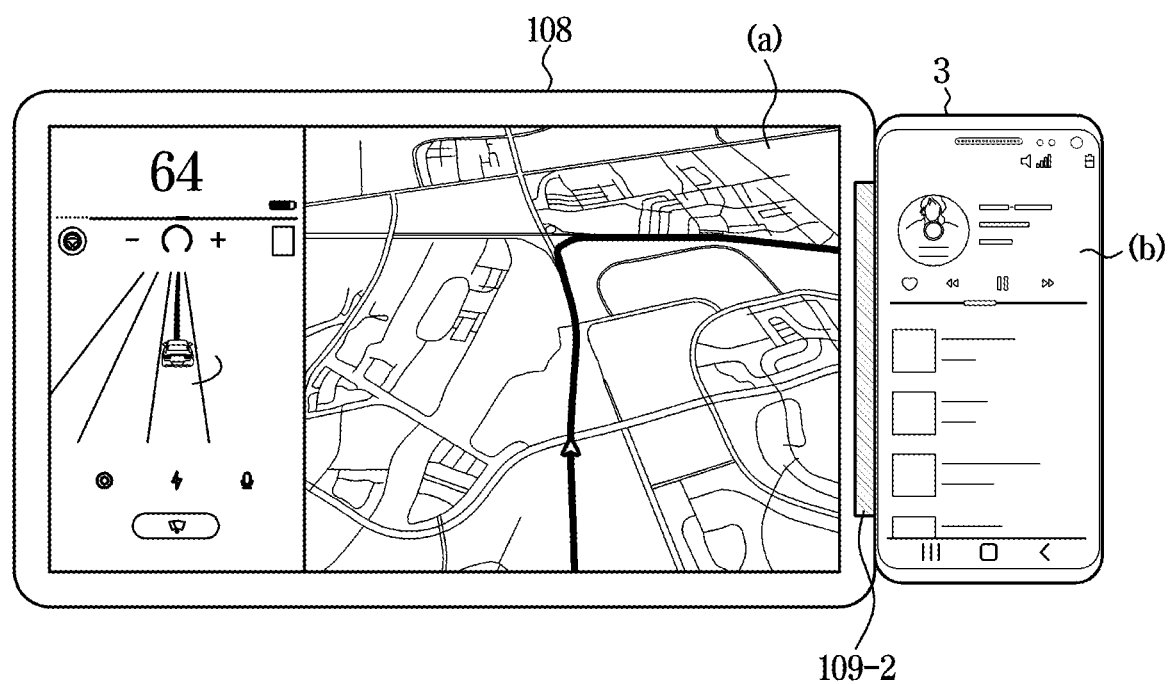
FIG. 8 is a view illustrating that a user terminal mounted on a right side holder according to an exemplary embodiment of the present disclosure.

FIG. 8 is a view illustrating a user terminal mounted on a right holder according to an exemplary embodiment of the present disclosure.

As shown in FIG. 8, the controller 200 may control the user interface device 100 to display the route information (a) of the vehicle operating information on the user interface device 100. At this time, upon determining that the user terminal 3 is mounted on the right holder 109-2, the controller 200 may determine the auxiliary information (b) to be displayed on the user terminal 3 mounted on the right holder 109-2 from among the route information (a) displayed on the user interface device 100.

The controller 200 may determine the priorities of the information displayed on the user interface device 100 based on the priority determination method, but may exceptionally, based on the user selection, display information not displayed on the user interface device 100 on the user terminal 3.

For example, the controller 200 may additionally display information, such as a music playlist, in which the user desires to be displayed on the user interface device 100 but is unable to display on the user interface device 100 because navigation information is being already displayed, on the user terminal 3.

Accordingly, by mounting the user terminal 3 on the user interface device 100, new information, for example related to entertainment, which cannot be displayed on the user interface device 100 in a conventional manner, can be displayed on the user interface device 100, thereby enhancing user convenience.

Figure 9:
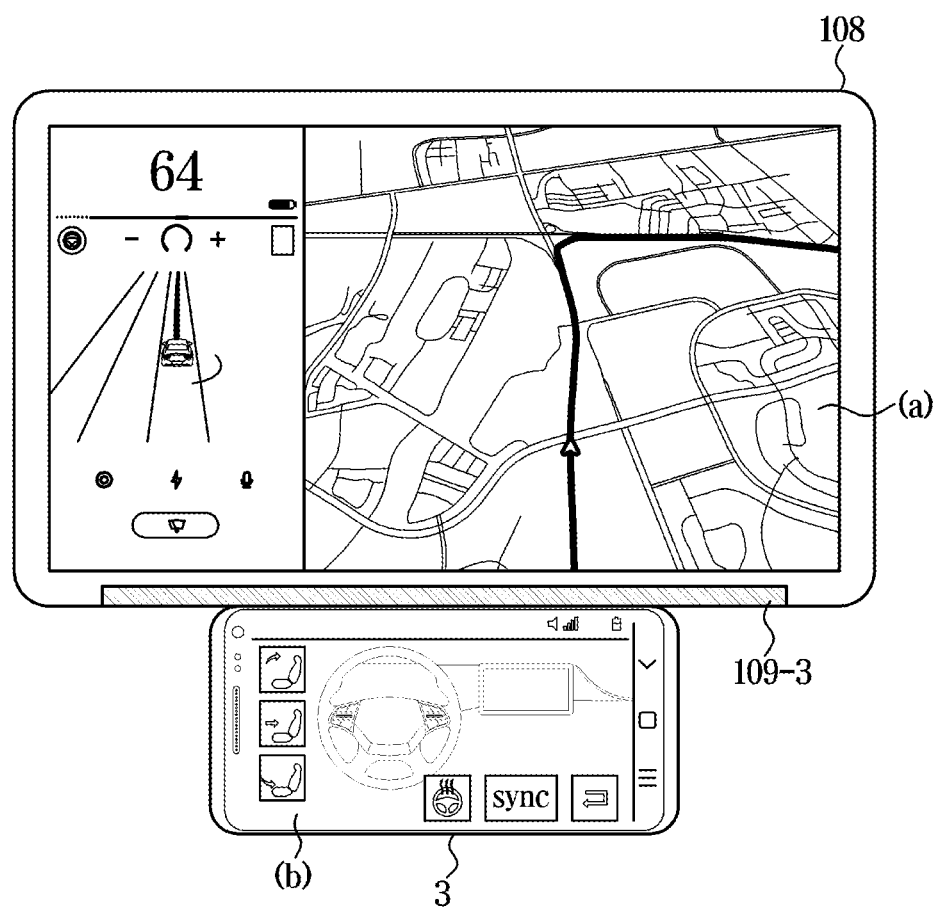
FIG. 9 is a view illustrating that a user terminal is mounted on a lower side holder according to an exemplary embodiment of the present disclosure.

FIG. 9 is a view illustrating that a user terminal is mounted on a bottom holder according to an exemplary embodiment of the present disclosure.

As shown in FIG. 9, the controller 200 may control the user interface device 100 to display the route information (a) of the vehicle operating information on the user interface device 100. At this time, upon determining that the user terminal 3 is mounted on the bottom holder 109-3, the controller 200 may determine the auxiliary information (b) to be displayed on the user terminal 3 mounted on the bottom holder 109-3 from among the route information (a) displayed on the user interface device 100.

The controller 200 may determine the priorities of the information displayed on the user interface device 100 based on the priority determination method, but may exceptionally, based on the user selection, display information not displayed on the user interface device 100 on the user terminal 3.

For example, the controller 200 may additionally display information, such as information related to air conditioning control in which the user desires to be displayed on the user interface device 100 but is unable to display on the user interface device 100 because navigation information is being already displayed, on the user terminal 3.

The controller 200 may receive an instruction input from the user terminal 3 based on communication with the user terminal 3, so that the user may perform air conditioning control through the user terminal 3.

Accordingly, by mounting the user terminal 3 on the user interface device 100, new information, for example related to function control, which cannot be displayed on the user interface device 100 in a conventional manner, can be displayed on the user interface device 100, thereby enhancing user convenience.

Figure 10:
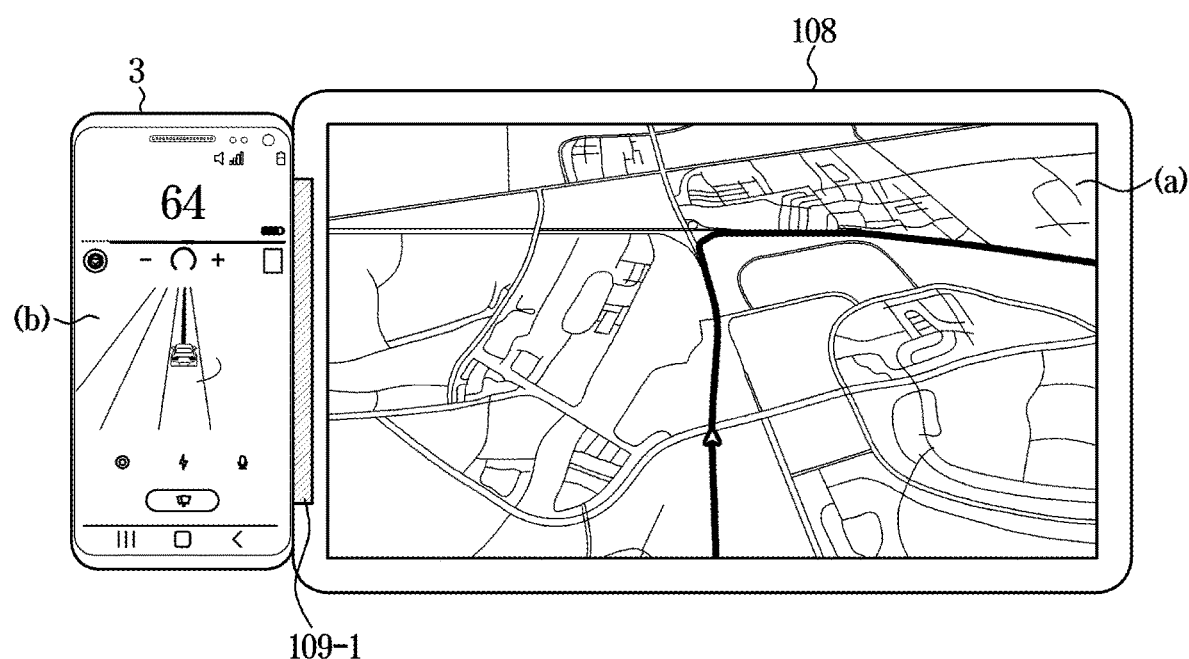
FIG. 10 is a view illustrating display of contents excluding auxiliary information in a user interface device of a vehicle according to an exemplary embodiment of the present disclosure.

FIG. 10 is a view illustrating the display of content excluding the auxiliary information in the user interface device 100 of the vehicle according to an exemplary embodiment of the present disclosure.

Referring to FIG. 10, the controller 200 may remove the auxiliary information from the user interface device 100 based on a user selection, and enlarge and display the size of the remaining information. Consequently, the auxiliary information (b) is displayed on the user terminal 3 mounted on the holder (e.g., left holder 109-1), and the vehicle operating information excluding the auxiliary information (b) is displayed on the user interface device 100, thereby making map screen wider.

For example, if the vehicle 1 according to one embodiment is a taxi, the controller 200 may display taxi operation information on the user interface device 100, and may transmit auxiliary information to the user terminal 3 based on the user terminal 3 being mounted, to display information on taxi reservation and taxi fare information on the user terminal 3 as the auxiliary information.

Furthermore, in response to a taxi call being received, the controller 200 may transmit auxiliary information to the user terminal 3 to display the location of a passenger as the auxiliary information to the user terminal 3. Accordingly, according to one embodiment, the vehicle 1 may more effectively determine the location of the passenger in order to increase the passenger's boarding convenience.

For another example, if the vehicle 1 according to another embodiment is the delivery vehicle 1, the controller 200 may display information on vehicle operation for delivery on the user interface device 100, and may transmit auxiliary information to the user terminal 3 based on the user terminal 3 being mounted in order to display information related to a delivery list and delivery as auxiliary information. Accordingly, the vehicle 1 according to one embodiment has an effect of increasing the efficiency of the delivery business.

Figure 11:
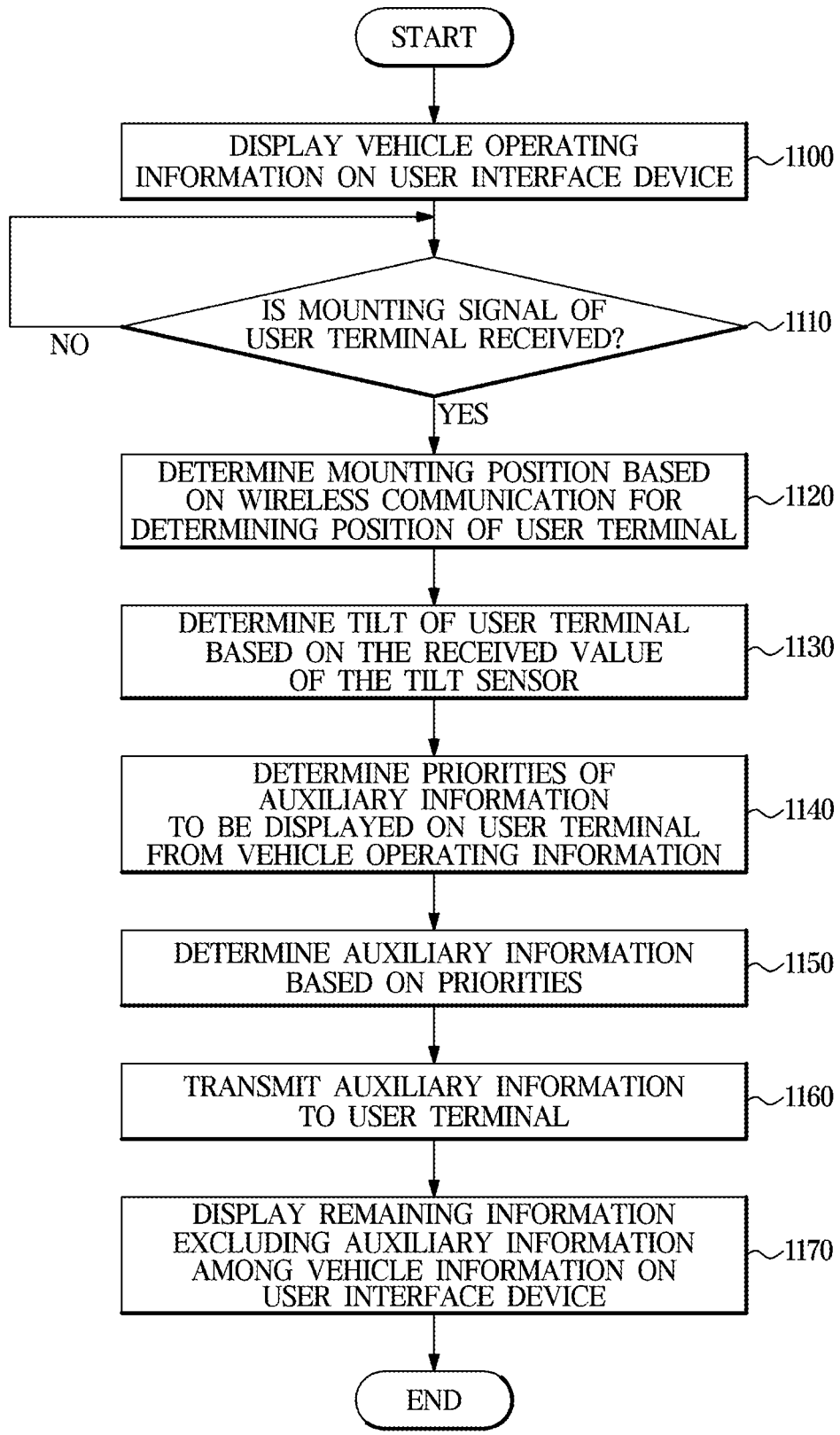
FIG. 11 is a flowchart illustrating a method of controlling a vehicle according to an exemplary embodiment of the present disclosure.

FIG. 11 is a flowchart illustrating a method of controlling a vehicle according to an exemplary embodiment of the present disclosure.

Referring to FIG. 11, the controller 200 may display the vehicle operating information on the user interface device 100 (operation 1100). At this time, the vehicle operating information may include route information, location information, speed information, and information suitable for the purpose of the commercial vehicle 1.

The controller 200 may determine whether a mounting signal of the user terminal 3 is received (operation 1110). When the user terminal 3 is mounted on the holder of the user interface device 100 and the mounting signal of the user terminal 3 is received (Yes in operation 1110), the controller 200 may determine the mounting position of the user terminal 3 based on wireless communication for determining the position of the user terminal 3 (operation 1120). The wireless communication technology used by the controller 200 to determine the position of the user terminal 3 may include location estimation technology, such as Bluetooth or UWB communication.

Thereafter, the controller 200 may receive the value output from the tilt sensor of the user terminal 3 through the communication interface 300, determine the tilt of the user terminal 3 based on the received value of the tilt sensor, and determine the mounting direction of the user terminal 3 according to the tilt (operation 1130).

Consequently, in response to the location and direction of the mounted user terminal 3 being determined, the controller 200 may determine the priorities of the auxiliary information to be displayed on the user terminal 3 from among the vehicle operating information based on the position and direction of the user terminal 3 (operation 1140).

Thereafter, the controller 200 may determine the information having the highest priority as the auxiliary information based on the determined priorities (operation 1150), and transmit the determined auxiliary information to the user terminal 3 (operation 1160). As described with reference to FIG. 10, the controller 200 may display on the user interface device 100 the remaining information, excluding the auxiliary information, from among the information about the vehicle 1 displayed on the user interface device 100 (operation 1170).

Figure 12:
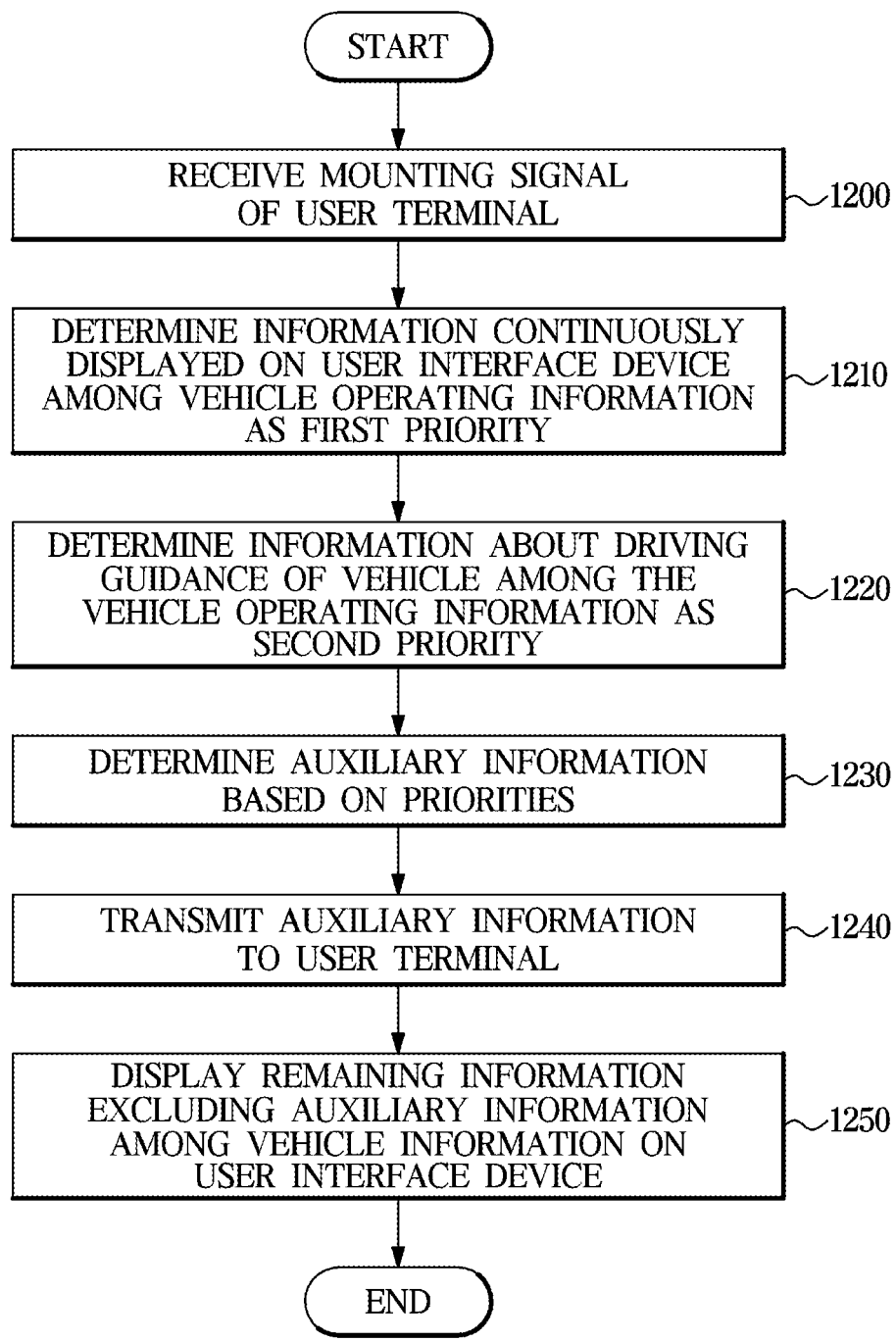
FIG. 12 is a view illustrating that a controller of a vehicle determines priorities of information related to vehicle operation according to an exemplary embodiment of the present disclosure.

FIG. 12 is a view illustrating that a controller of a vehicle determines priorities of information related to vehicle operation according to an exemplary embodiment of the present disclosure.

Referring to FIG. 12, as in FIG. 11, the controller 200 may receive the mounting signal of the user terminal 3 (operation 1200). The controller 200 may determine the information continuously displayed on the user interface device 100 among the vehicle operating information displayed on the user interface device 100 based on the reception of the mounting signal of the user terminal 3 as the first priority (operation 1210). In addition, the controller 200 may determine the information about the driving guidance of the vehicle 1 among the vehicle operating information of the vehicle 1 displayed on the user interface device 100 as the second priority (operation 1220).

As a result, the controller 200 may determine the priorities of the vehicle operating information of the vehicle 1 displayed on the user interface device 100, and then determine the auxiliary information based on the priorities (operation 1230). Thereafter, the controller 200 may transmit the determined auxiliary information to the user terminal 3 (operation 1240), and accordingly the controller 200 may display the remaining information, excluding the auxiliary information from the information relating to the vehicle 1 displayed on the user interface device 100, on the user interface device 100 (operation 1250).

Figure 13:
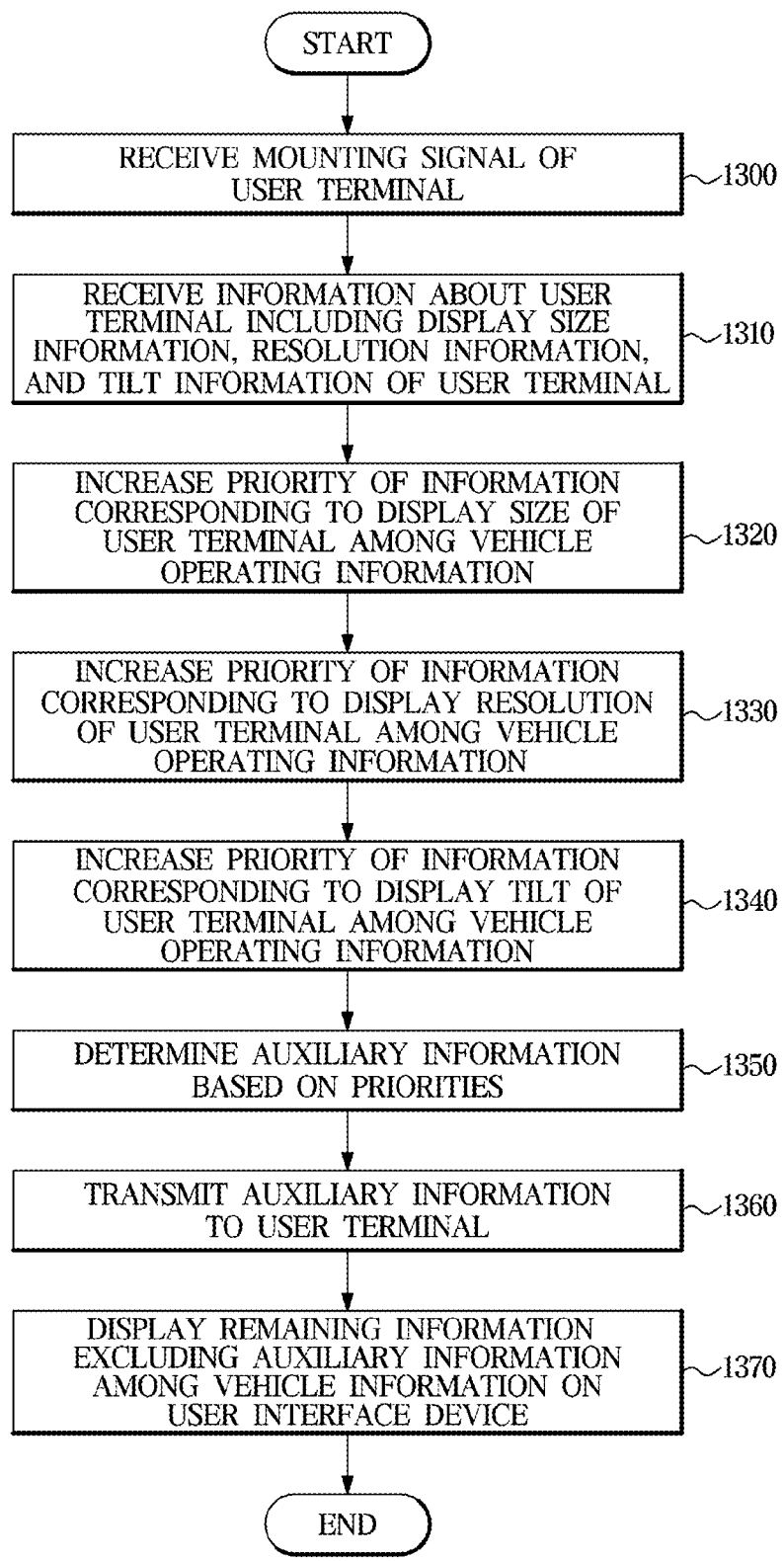
FIG. 13 is a view illustrating that a controller of a vehicle determines a priority based on user terminal information according to an exemplary embodiment of the present disclosure.

FIG. 13 is a view illustrating that a controller of a vehicle, according to an exemplary embodiment of the present disclosure, determines priorities based on user terminal information.

Referring to FIG. 13, the controller 200 may receive the mounting signal of the user terminal 3 (operation 1300). The controller 200 may control the communication interface 300 to receive the information about the user terminal 3 including display size information, resolution information, and tilt information of the user terminal 3 (operation 1310).

The controller 200 may increase the priority of information corresponding to the display size of the user terminal 3 among the received information of the user terminal 3 (operation 1320). For example, when determining the priorities of information to be displayed on the user terminal 3 based on the first and second priorities, the controller 200 may change the priority information of the second priority to the first priority and display in response to the display size of the user terminal 3 being is smaller than the information of the first priority.

In addition, the controller 200 may increase the priority of information corresponding to the display resolution of the user terminal 3 among the received information about the user terminal 3 (operation 1330). For example, when determining the priorities of information to be displayed on the user terminal 3 based on the first and second priorities, the controller 200 may change the priority information of the second priority to the first priority and display upon determining that the resolution of the user terminal 3 does not match the information of the first priority.

In addition, the controller 200 may increase the priority of information corresponding to the display tilt of the user terminal 3 among the received information about the user terminal 3 (operation 1340). For example, when determining the priorities of information to be displayed on the user terminal 3 based on the first and second priorities, the controller 200 may determine the mounting direction of the user terminal 3 from the tilt information of the user terminal 3, and upon determining that the mounting direction of the user terminal 3 does not match the direction included in the information of the first priority, change the priority information of the second priority to the first priority and display.

The controller 200 may determine the auxiliary information based on the priorities (operation 1350) and transmit the determined auxiliary information to the user terminal 3 (operation 1360). Thereafter, the controller 200 may display on the user interface device 100 the remaining information, excluding the auxiliary information from the information relating to the vehicle 1 displayed on the user interface device 100 (operation 1370).

According to the vehicle according to various embodiments of the present disclosure, the controller may determine the auxiliary information to be displayed on the user terminal in consideration of the mounting location, mounting direction, and vehicle operating information of the user terminal, so that the user can view a lot of information on a wider screen.

As is apparent from the above, various embodiments of the present disclosure may provide a vehicle capable of displaying additional information on the user terminal by expanding connectivity between the user terminal and the IVI device, thereby enhancing user convenience.

Further, various embodiments of the present disclosure may provide a vehicle capable of displaying information used in commercial vehicles in a wider area by expanding connectivity between the user terminal and the IVI device.

On the other hand, the above-described embodiments may be implemented in the form of a recording medium storing instructions executable by a computer. The instructions may be stored in the form of program code. When the instructions are executed by a processor, a program module is generated by the instructions so that the operations of the disclosed embodiments may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although embodiments of the disclosure have been shown and described, it would be appreciated by those having ordinary skill in the art that changes may be made in these embodiments without departing from the principles and spirit of the disclosure, the scope of which is defined in the claims and their equivalents.

What is claimed is:

1. A vehicle, comprising:
   at least one holder;
   a communication interface configured to communicate with a user terminal;
   a user interface device configured to visualize and output vehicle operating information; and
   a controller configured to, in response to the user terminal being mounted on the at least one holder:
   identify a position of the user terminal;
   determine auxiliary information to be displayed on the user terminal from the vehicle operating information based on the position of the user terminal; and
   control the communication interface to transmit the auxiliary information to the user terminal.

2. The vehicle of claim 1, wherein the vehicle operating information includes first information and second information, and wherein the controller is further configured to determine priorities of the first information and the second information, and determine whether to identify the first information or the second information as the auxiliary information based on the priorities.

3. The vehicle of claim 2, wherein the controller is further configured to determine information continuously displayed on the user interface device as a first priority between the first information and the second information.

4. The vehicle of claim 3, wherein the controller is further configured to determine information about driving guidance of the vehicle as a second priority between the first information and the second information.

5. The vehicle of claim 1, wherein the vehicle operating information includes first information and second information, and wherein the controller is further configured to:
   receive information about the user terminal through the communication interface;
   determine priorities of the first information and the second information based on a position of the user terminal and the information about the user terminal; and
   determine, based on the priorities, whether to identify the first information or the second information as the auxiliary information.

6. The vehicle of claim 5, wherein the information about the user terminal further includes at least one of display size information, display resolution information, and tilt information of the user terminal.

7. The vehicle of claim 6, wherein the controller is further configured to:
   determine the first information as the auxiliary information in response to the tilt information of the user terminal being identified as a first reference value; and
   determine the second information as the auxiliary information in response to the tilt information of the user terminal being identified as a second reference value.

8. The vehicle of claim 1, wherein the vehicle operating information includes first information and second information, and wherein the controller is further configured to:
   determine the first information as the auxiliary information in response to the position of the user terminal being identified as a first side of the user interface device; and
   determine the second information as the auxiliary information in response to the position of the user terminal being identified as a second side of the user interface device.

9. The vehicle of claim 1, wherein the controller is further configured to control the user interface device to visualize and output remaining information, excluding the auxiliary information from the vehicle operating information.

10. The vehicle of claim 1, wherein the controller is further configured to control the communication interface to identify the position of the user terminal based on an ultra-wideband (UWB) communication or a Bluetooth communication.

11. A method of controlling a vehicle including at least one holder, a communication interface communicating with a user terminal, and a user interface device visualizing and outputting vehicle operating information, the method comprising:
    identifying, by a controller, a position of the user terminal in response to the user terminal being mounted on the at least one holder;
    determining auxiliary information to be displayed on the user terminal from the vehicle operating information based on the position of the user terminal; and
    controlling the communication interface to transmit the auxiliary information to the user terminal.

12. The method of claim 11, wherein the vehicle operating information includes first information and second information, and wherein determining of the auxiliary information further comprises:
    determining priorities of the first information and the second information; and
    determining whether to identify the first information or the second information as the auxiliary information based on the priorities.

13. The method of claim 12, wherein the determining of the priorities further comprises determining information continuously displayed on the user interface device as a first priority between the first information and the second information.

14. The method of claim 13, wherein the determining of the priorities further comprises determining information about driving guidance of the vehicle as a second priority between the first information and the second information.

15. The method of claim 11, wherein the vehicle operating information includes first information and second information, and wherein the determining of the auxiliary information further comprises:
    receiving information about the user terminal through the communication interface;
    determining priorities of the first information and the second information based on a position of the user terminal and based on the information about the user terminal; and
    determining, based on the priorities, whether to identify the first information or the second information as the auxiliary information.

16. The method of claim 15, wherein the information about the user terminal further includes at least one of display size information, display resolution information, and tilt information of the user terminal.

17. The method of claim 16, wherein the determining of the priorities further comprises:

determining the first information as the auxiliary information in response to the tilt information of the user terminal being identified as a first reference value; and determining the second information as the auxiliary information in response to the tilt information of the user terminal being identified as a second reference value.

18. The method of claim 11, wherein the vehicle operating information includes first information and second information, and wherein the determining of the priorities further comprises:

determining the first information as the auxiliary information in response to the position of the user terminal being identified as a first side of the user interface device; and determining the second information as the auxiliary information in response to the position of the user terminal being identified as a second side of the user interface device.

19. The method of claim 11, further comprising controlling the user interface device to visualize and output remaining information, excluding the auxiliary information from the vehicle operating information.

20. The method of claim 11, wherein the identifying of the position of the user terminal further comprises controlling the communication interface to identify the position of the user terminal based on an ultra-wideband (UWB) communication or a Bluetooth communication.

* * * * *